United States Patent [19]

Spengler

[11] 4,405,537
[45] * Sep. 20, 1983

[54] METHOD AND APPARATUS FOR MANUFACTURING THREE-DIMENSIONAL WORK PIECES

[75] Inventor: Ernst M. Spengler, Heusenstamm, Fed. Rep. of Germany

[73] Assignee: Stanztechnik GmbH R & S, Frankfurt, Fed. Rep. of Germany

[ * ] Notice: The portion of the term of this patent subsequent to Jun. 16, 1998, has been disclaimed.

[21] Appl. No.: 260,418

[22] Filed: May 4, 1981

Related U.S. Application Data

[63] Continuation-in-part of Ser. No. 965,745, Dec. 4, 1978, Pat. No. 4,273,738.

[51] Int. Cl.³ ............................................. B29C 1/16
[52] U.S. Cl. .................................. 264/45.4; 264/46.4; 264/138; 264/163; 264/279; 264/321
[58] Field of Search ................... 264/45.1, 46.4, 46.6, 264/46.8, 138, 163, 321, 135, 264, 271.1, 279, 45.4

[56] References Cited

U.S. PATENT DOCUMENTS

| | | | |
|---|---|---|---|
| 2,690,987 | 10/1954 | Jeffries | 264/135 |
| 3,461,761 | 8/1969 | Mojonnier | 264/163 |
| 3,832,264 | 8/1974 | Barnette | 264/271.1 |
| 3,994,763 | 11/1976 | Sheoth | 264/135 |
| 4,106,379 | 8/1978 | Spengler | 83/465 |
| 4,130,615 | 12/1978 | Decker | 264/264 |
| 4,186,536 | 2/1980 | Piazza | 264/279 |

Primary Examiner—John A. Parrish
Attorney, Agent, or Firm—W. G. Fasse; D. H. Kane, Jr.

[57] ABSTRACT

A three-dimensional work piece, such as an interior part for a car, is manufactured by keeping the blank, such as a sheet of plastic on or in the same primary mold 24 for the initial shaping step, for the foaming step, for the curing step and for the final trimming step. The primary mold 24 shuttles back and forth in a given direction for sequential cooperation with two secondary molds 75 and 31 or 48 and 31 arranged for reciprocation in a direction extending perpendicularly to said given direction. Preferably, two primary mold members 66, 67 are arranged for horizontal back and forth shuttling in unison so that each primary mold member may cooperate with two out of three vertically reciprocable secondary molds. The efficiency is substantially doubled when each of two primary mold members 66, 67 cooperates with two out of three secondary molds. Three stations 1, 3, 10 are located next to one another so that the two primary mold members, which are rigidly connected to each other, may shuttle back and forth between two adjacent stations 1 and 3 or 1 and 10.

21 Claims, 11 Drawing Figures

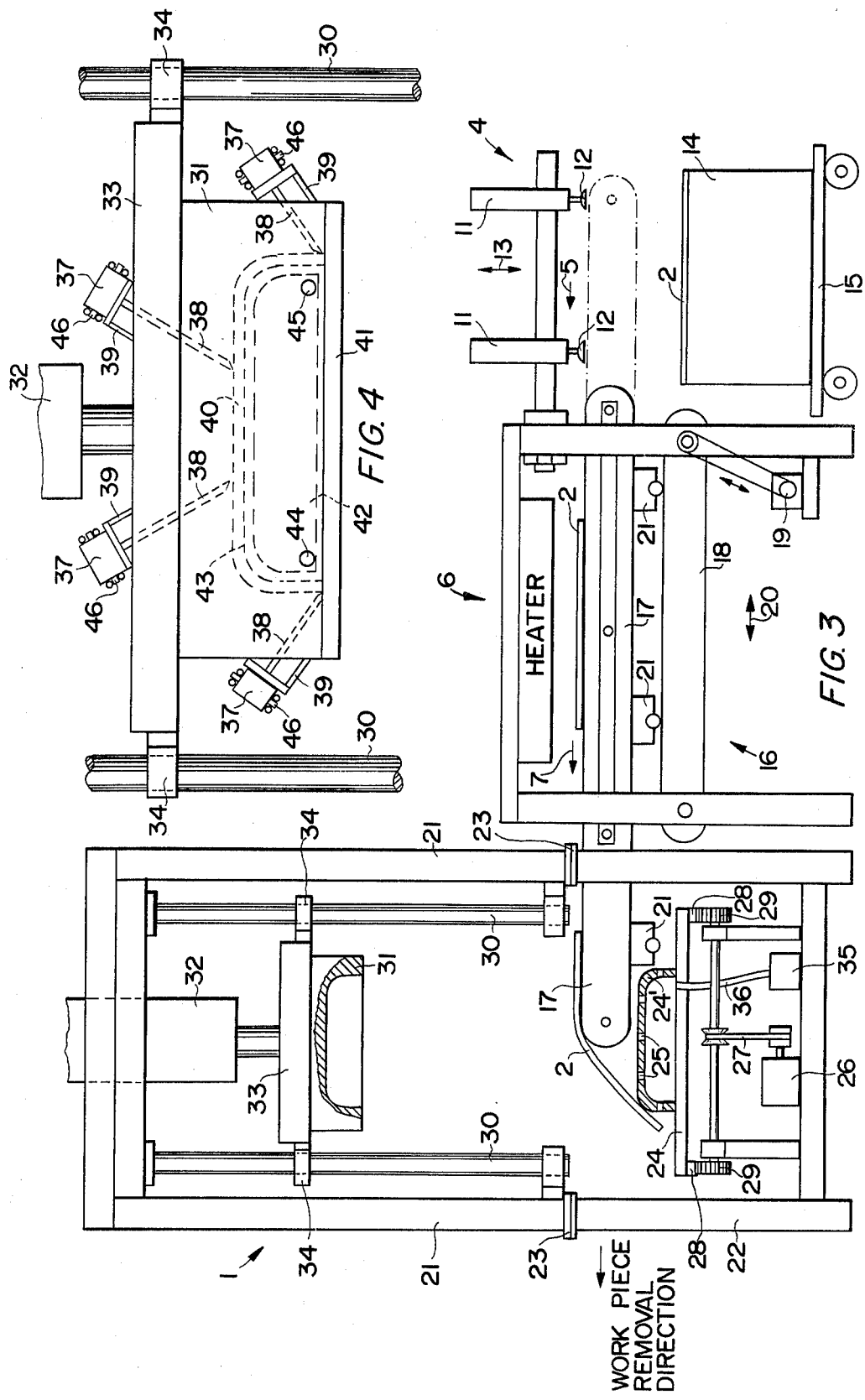

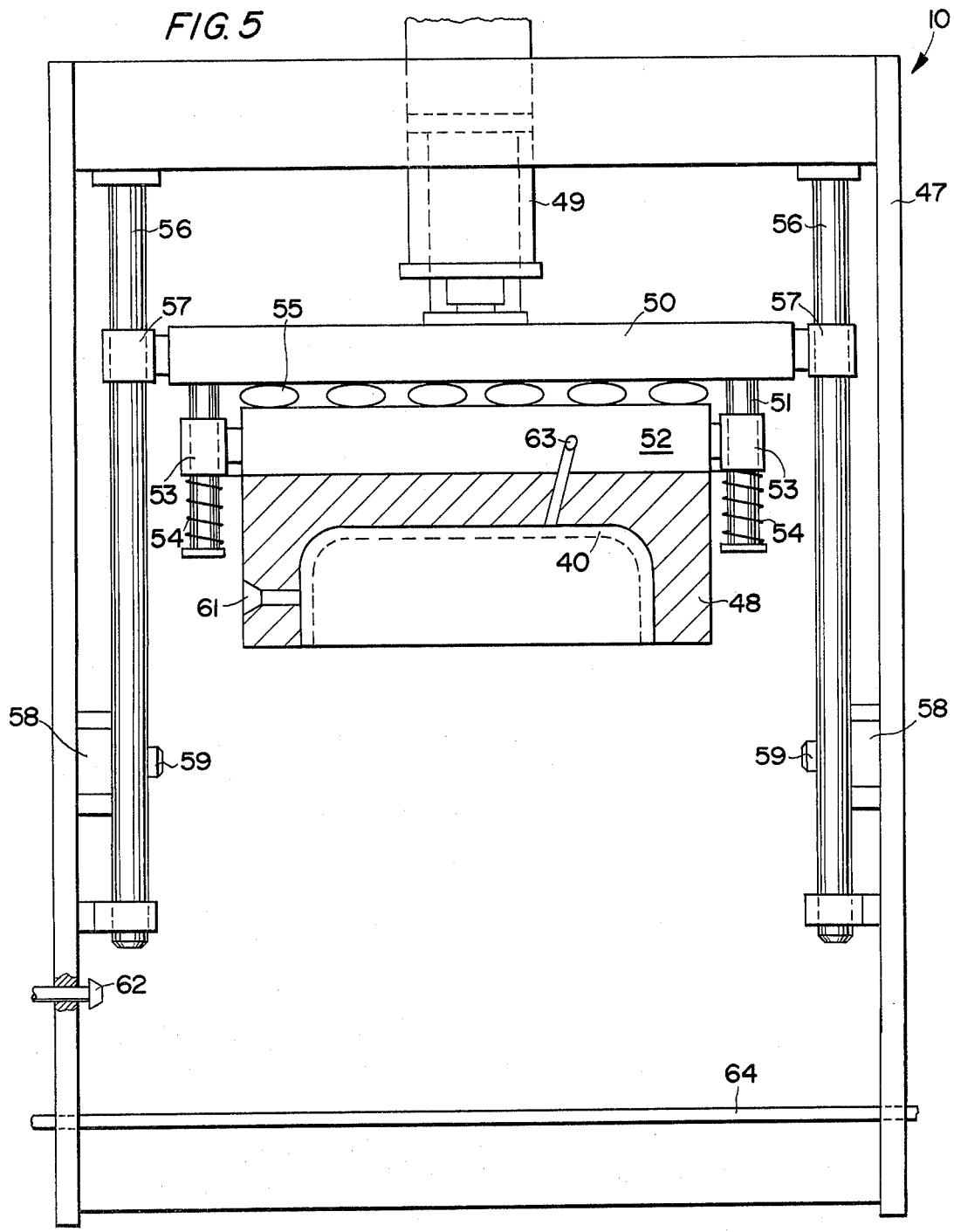

METHOD AND APPARATUS FOR MANUFACTURING THREE-DIMENSIONAL WORK PIECES

CROSS-REFERENCE TO RELATED APPLICATION

The present application is a continuation-in-part application of my copending Ser. No. 965,745 filed Dec. 4, 1978 now U.S. Pat. No. 4,273,738, for a Method and Apparatus for Forming and Trimming Three-Dimensional Work Pieces.

BACKGROUND OF THE INVENTION

The present invention relates to a method and apparatus for manufacturing three-dimensional work pieces. Flat work pieces in this context are not considered to be three-dimensional work pieces, even if they have a substantial thickness. An interior car part is a typical example of a three-dimensional work piece manufactured according to the invention.

In my copending application now U.S. Pat. No. 4,273,738, a lower mold cooperates with an upper mold for shaping an initially flat sheet of plastic material. At least one mold or support carries trimming tools which are moved through the respective mold in order to trim the work piece while it is still in the same mold. My prior application does not teach the cooperation of one or two primary molds with several secondary molds in sequence.

My U.S. Pat. No. 4,106,379 which issued on Aug. 15, 1978, for an apparatus for trimming three-dimensional work pieces discloses a lower support which cooperates with trimming tools and which may shuttle back and forth between a loading station and the trimming station.

U.S. Pat. No. 4,063,477 discloses an apparatus and method for cutting carpet. A stationary lower support and a vertically movable upper support held by pre-shaped carpet in position for the cutting operation. Vertically movable first cutting means travel through the lower and upper support which hold the carpet during the cutting. Second cutting means are positioned for cutting in directions extending at an angle to the vertical or horizontal direction. The apparatus of U.S. Pat. No. 4,063,477 is also not suitable for the sequential shaping, foaming, and trimming of the same work piece while the work piece is retained on the same primary mold during all manufacturing steps.

U.S. Pat. No. 3,273,203 discloses an apparatus for transferring plastic sheet material from one station to another station in a system of cooperating machines.

The prior art machines are not suitable for first forming a plastic sheet into a desired three-dimensional shape and then foaming and trimming the sheet or rather the three-dimensional shape.

OBJECTS OF THE INVENTION

In view of the foregoing, it is the aim of the invention to achieve the following objects singly or in combination:

to simplify the production of three-dimensional work pieces, such as dashboards, door panels, and the like, by performing a plurality of work steps in several stations of a single machine, rather than in several separate machines;

to use a single primary mold, which may be of the male or female type, in such a way that it cooperates with a plurality of secondary or complementary female or male molds in a sequential operation;

to reciprocate or shuttle a plurality of molds relative to each other so that several manufacturing steps including shaping, foaming, curing, and trimming may be performed in a single manufacturing system without removing the work piece from the primary mold;

to assure the dimensional stability and shape accuracy of the work piece by retaining the work piece on the same primary mold during all manufacturing steps;

to flow a coolant, such as water, through a mold under such pressure that the coolant performs a cooling function and that it increases the dimensional stability of the mold configuration whereby the molds may be of a relatively light construction;

to lock the movable mold means rigidly to a machine frame when the mold means are pressurized so that the forces are directly introduced into the machine frame to relieve the mold support and mold moving or drive means; and to tilt at least a portion of a mold means between a molding position and a mold treatment position.

SUMMARY OF THE INVENTION

The present method transforms a flat blank of plastics material into a three-dimensional work piece by first placing the flat blank, such as a sheet of ABS resin or of other suitable thermo-plastic polymers, such as polypropylene, into or onto a first primary mold which may be of the female kind having a cavity or of the male kind having a respective projection or projections. The blank is then shaped while it contacts the first mold and assumes the form of the first mold, for example by the application of a vacuum through holes in the first mold. The shaping may also be accomplished by pressing two mold components together. The mold blank is then brought into contact with a foaming material, e.g. a two components polyurethane foam material. The foaming is performed while one side of the molded blank is still in full contact with the primary or first mold. The first mold is enclosed by means of a second secondary mold so as to assure the curing of the foamed material in a confined space, preferably under pressure, whereby the foamed material is bonded to the plastics material of the molded blank to form the three-dimensional work piece. The first mold still carrying the three-dimensional work piece is then separated from the second, secondary mold and moved with the work piece into a cooperating position relative to a third secondary mold which operates as the counter-holder for the trimming operation. Thus, the work piece remains in the same first or primary mold during all the recited manufacturing steps. It follows from the foregoing that the primary mold must be compatible for sequential cooperation with a plurality of secondary mold means.

The foaming operation may be performed after first closing the first and second molds to form a molding space into which the foaming material is introduced. First closing the mold cavity will be preferable where the primary, lower mold in a male type mold with projections rather than with a cavity into which the spraying of the two components foaming materials could start even before closing the cavity.

The apparatus according to the invention comprises at least two, preferably three, operating stations. The first or primary mold means are movably supported in the first station. Drive means operatively connected to the first mold means reciprocate the first mold means in a given direction. The first mold means cooperate with forming means, for example in the form of a vacuum effective through the first mold means, or with a secondary mold means to form a molding cavity for the shaping of the flat blank. The second station supports the second, secondary mold means also for movement into cooperation with the first mold means whereby the second mold means are driven by their respective drive means in a direction substantially perpendicularly to the direction of movement of the first mold means. The first station also supports third secondary mold means which operate as a counter-holder and which are driven by third drive means in a direction substantially perpendicularly to the movement of the first mold means so that the third mold means may also cooperate with the first mold means. The third mold means carry trimming tools which are driven by a separate fourth drive means and which are arranged so as to be able to move the trimming tool means relative to a three-dimensional plane defined by at least one of the mold means, for example, the third mold means.

An improvement is achieved by arranging the first station between two auxiliary stations whereby the third station carries fourth secondary mold means and the first, primary mold means comprise two mold members arranged in such a manner that one first mold member may cooperate with the second and third secondary mold means while the other first mold member may cooperate with the fourth and third secondary mold means, for example by shuttling the two first mold members horizontally back and forth and by reciprocating the second, third, and fourth mold means vertically back and forth.

By keeping the work piece in or on the first, primary mold during all manufacturing steps, the inventions achieves the important advantage that the work piece retains its dimensional stability and thus very accurately shaped work pieces may be manufactured according to the invention. Moreover, the time loss and labor costs involved in the prior art for moving a partially finished work piece from one machine to the other are avoided according to the invention which is a substantial economical advantage. Another important advantage of the invention is seen in that only one primary mold is needed rather than at least two or three molds in the prior art. The present molds may be made of glass fiber reinforced synthetic resin material.

BRIEF FIGURE DESCRIPTION

In order that the invention may be clearly understood, it will now be described, by way of example, with reference to the accompanying drawings, wherein:

FIG. 3 is a side view substantially toward the plane indicated by the arrows 3—3 in FIGS. 1 and 2;

FIG. 4 is an enlarged, more detailed side view of cooperating primary and secondary mold means also shown in FIG. 3;

FIG. 5 is a front view, partially in section, of the left station or machine unit in the direction of the arrow A in FIG. 2 showing the secondary mold means in the raised position;

DETAILED DESCRIPTION OF PREFERRED EXAMPLE EMBODIMENTS AND OF THE BEST MODE OF THE INVENTION

Figure 1:
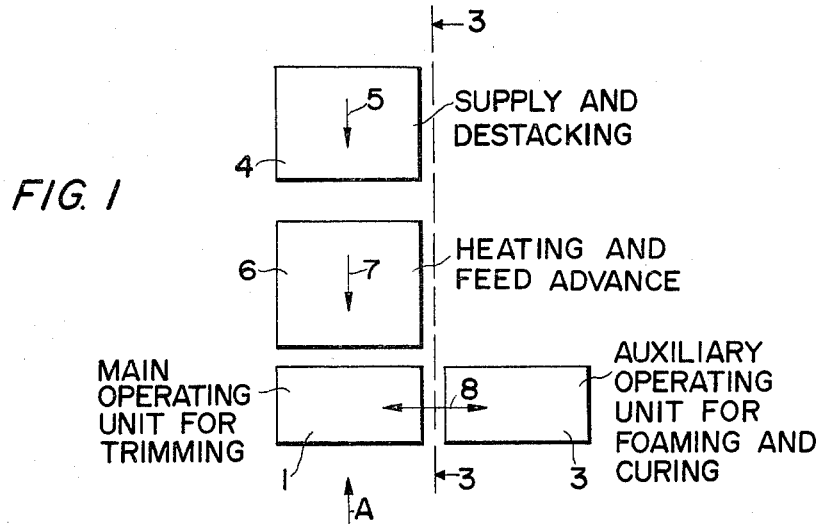
FIG. 1 is a block top plan view of a set of machine stations for explaining the coordination of these stations in performing the method steps of the invention.

The machine system shown in FIG. 1 comprises a main operating unit 1 for the initial shaping of a flat blank 2 of sheet material shown in FIG. 3. The trimming of the shaped work piece is performed in the unit 1. An auxiliary operating unit 3 for the foaming and curing is arranged directly adjacent to the unit 1. The flat blanks are fed by the supply and destacking unit 4 in the direction of the arrow 5 to a heating and feed advance unit 6 which feeds the blanks while they are being heated in the direction of the arrow 7 into the main operating unit 1. The units 4 and 6 are conventional. First primary mold means shown in FIG. 3, for example, are arranged to shuttle horizontally back and forth between the units 1 and 3 as indicated by the arrow 8.

Figure 2:
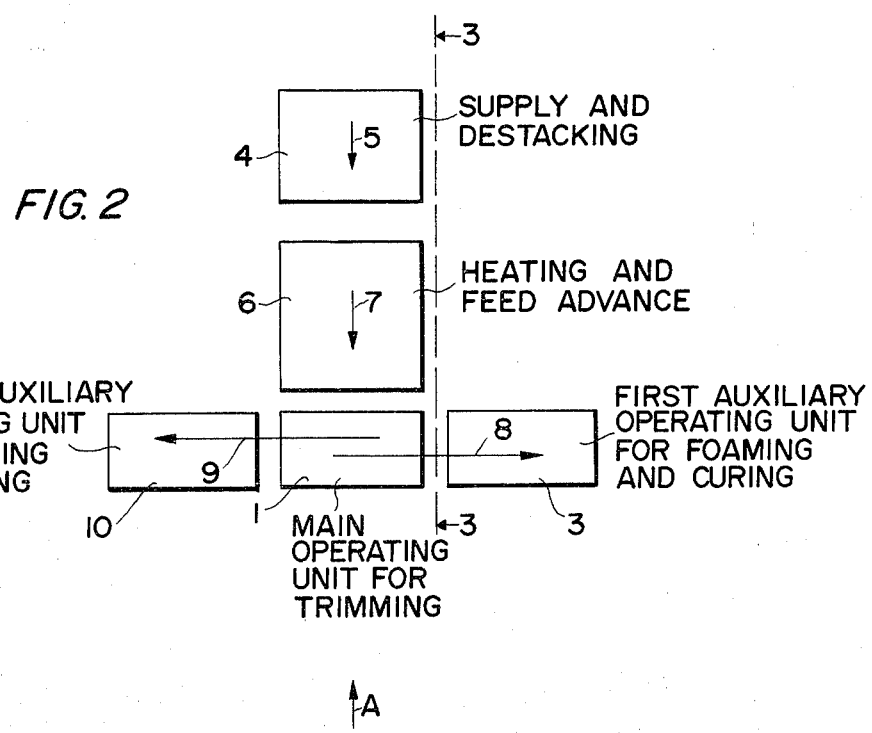
FIG. 2 is a view similar to that of FIG. 1 for explaining a modification of the present method.
Figure 6:
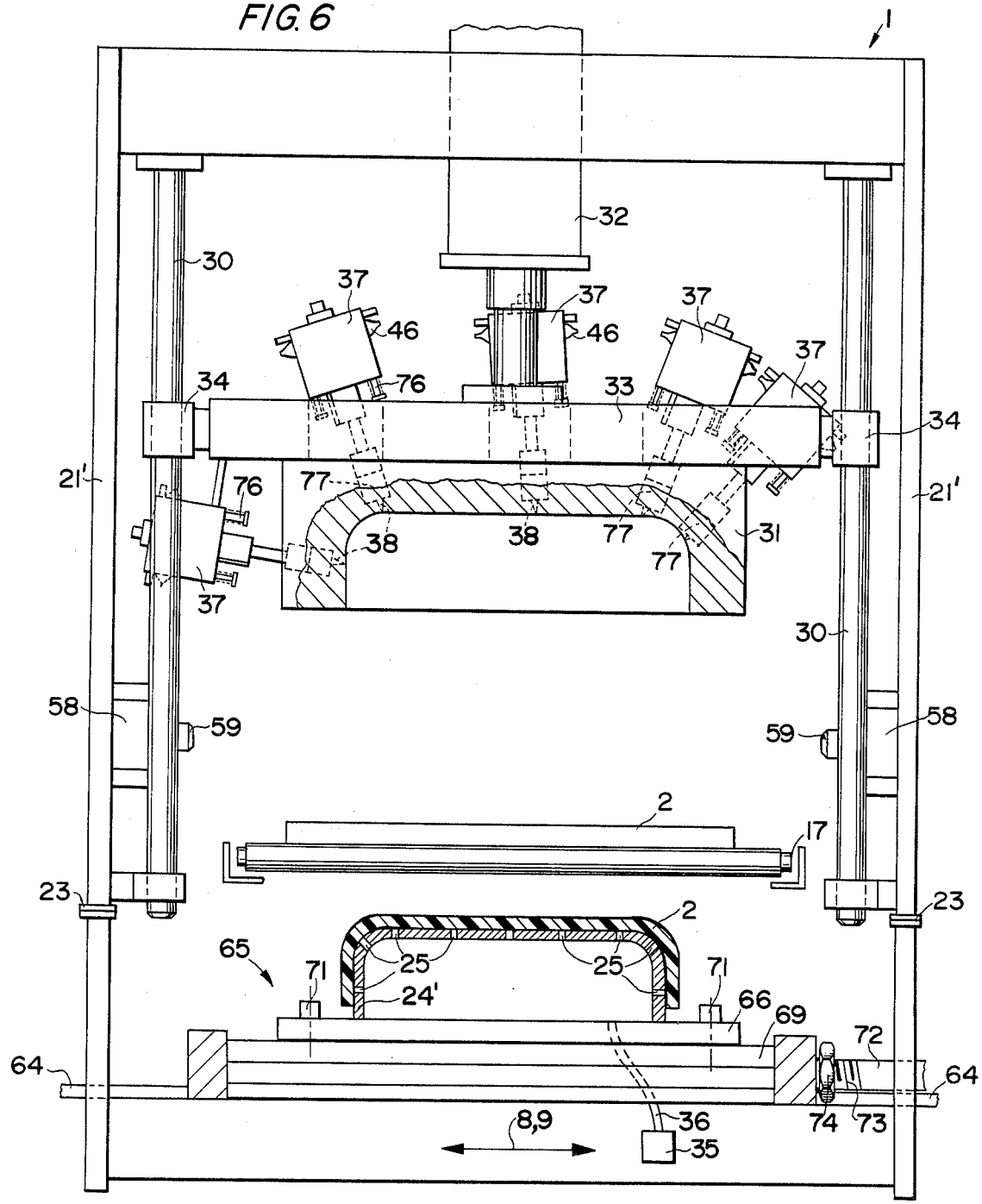
FIG. 6 is a front view, partially in section, of the central station or unit in the direction of the arrow A in FIG. 2 showing the secondary mold means with the trimming tools in a partially raised position.
Figure 7:
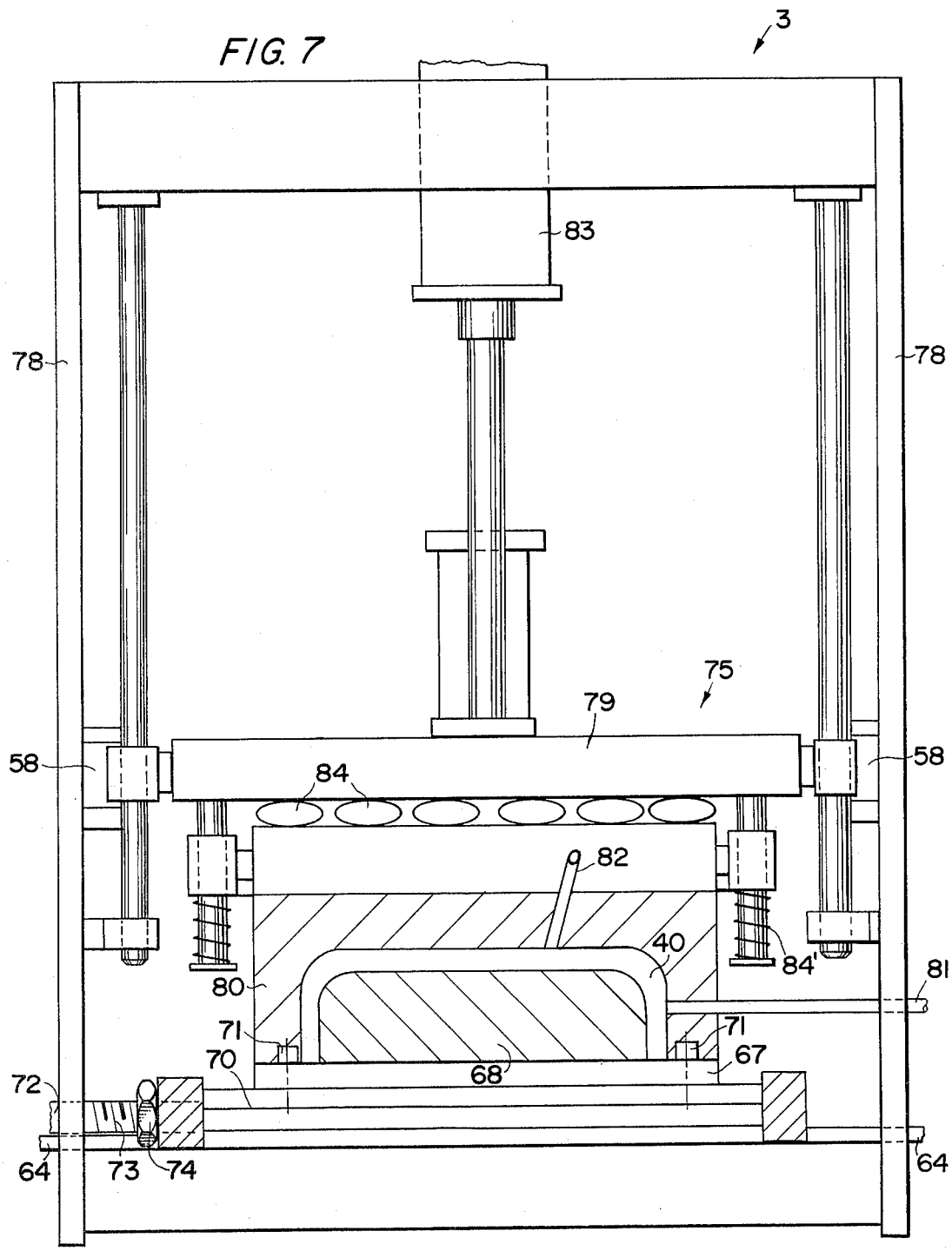
FIG. 7 is a front view, partially in section, of the right station or unit in the direction of the arrow A in FIG. 2 showing the primary and secondary mold means in the closed position.

The system of FIG. 1 is modified in FIG. 2 by a second auxiliary operating unit 10 for the foaming and curing of a work piece. The first or primary mold means comprise two members as shown in FIGS. 6 and 7 which shuttle horizontally back and forth for cooperation with unit 3, see arrow 8, and for cooperation with unit 10, see arrow 9. In the system of FIG. 2, the efficiency or output capacity of work pieces per unit of time is substantially doubled as compared to the system of FIG. 1. The output capacity in work pieces per hour depends on the curing time of the foam material which is conventionally about 2 to 4 minutes. For example, for a 4 minute curing time the system of FIG. 1 can produce 30 work pieces per hour, or twice as many as in a conventional single mold. The system of FIG. 2 improves the output capacity still further due to the use of three stations.

FIG. 3 is a view toward plane 3—3 in FIGS. 1 and 2. The sheet supply apparatus 4 comprises, for example, a plurality of piston cylinder members 11 which move suction cups 12 up and down, see arrow 13, for picking up flat sheets 2 from a stack 14 on a supply cart 15 which may comprise conventional means for lifting the stack, for example a hydraulic jack.

The heating and feed advance unit 6 comprises a double conveyor system 16 comprising an upper conveyor 17 and a lower conveyor 18. The lower conveyor 18 is driven by drive means 19 so that the upper run of the conveyor 18 moves alternately to the right and left as indicated by the double arrow 20. The upper conveyor 17 is, for example, a chain or roller conveyor, and it rotates always in the same direction, as indicated by the arrow 7. However, additionally, the entire conveyor 17 travels back and forth horizontally due to its cooperation with the lower conveyor 18. For this purpose the upper conveyor comprises at least three roller engagement members 21 which are so spaced that at all times at least two of these engagement members 21 are securely engaging the upper run of the lower conveyor 18. Thus, in the leftmost position of the upper conveyor 18, shown in FIG. 3, the central engagement member 21 and the right-hand engagement member 21 are engaging the upper run of the conveyor 18. When the upper conveyor 17 is in the right-hand position, shown in dashed lines in FIG. 3, the central and left-hand engagement members 21 will engage the upper run of the conveyor 18.

When the conveyor 17 is in the left position, as shown in FIG. 3, the suction cups 12 will be moved down to pick up the topmost blank 2 from the stack 14 and lift the blank to a level sufficiently above the upper run of the conveyor 17 so that the blank may be dropped onto the upper run of the conveyor 17 when the latter is in the dashed-dotted right position. When the conveyor 17 is in the right-hand position, it does not interfere with the operation of the mold means shown in the main operating unit 1.

The main operating unit 1 comprises an upper machine frame 21 and a machine base 22. The upper machine frame 21 is removably secured to the lower machine frame 22, as shown at 23 whereby the upper machine frame 21 may be exchanged with all the components carried by the upper machine frame as described in more detail in my above mentioned U.S. Pat. No. 4,273,738.

The machine base 22 carries first or primary mold means 24 including a male mold body 24' provided with suction holes 25. The primary mold means 24 are movable in a direction perpendicularly to the plane of the drawing. First drive means 26, such as a reversible motor, drive the primary mold means 24 in a shuttling back and forth movement, for example, by means of a chain or pulley drive 27, rack members 28, and pinions 29. The shuttling movement of the primary mold means 24 is not limited to the just described drive means. For example, a conveyor comprising conveyors such as shown at 17 and 18 in FIG. 3 could also be used for shuttling the first mold means 24 horizontally back and forth.

The upper machine frame 21' carries guide rods 30 for guiding the vertical up and down movement of third mold means 31 driven by third drive means 32, such as a piston cylinder device. A support 33 carries the third mold means 31 and is provided with slide bearings 34 which slide up and down the guide rods 30. The dimensions are such that the third mold means 31 may be moved down sufficiently to enclose the first mold body 24', for example, during a shaping or trimming operation to be described in more detail below. However, the shaping of the flat blank 2 may even be accomplished without the closing of the first and third mold means by applying suction to the interior of the mold body 24', for example by means of a suction pump 35 operatively connected to the interior of the mold body 24' by a flexible hose 36. The hose 36 is of sufficient length to permit the horizontal back and forth shuttling movement of the primary mold means 24. The suction is effective through the holes 25 in the mold body 24' whereby the initially flat blank 2 assumes the shape of the mold body 24'.

The support 33 for the third mold means 31 also carries the trimming tools 37 which are not shown in FIG. 3 for simplicity's sake but which are shown in FIG. 4. These trimming tools carry, for example, strip steel knives 38 and are supported by brackets 39. Further details of such trimming tools are described in my above-mentioned copending application. The strip steel knives 38 reach through the support 33 and third mold means 31 so as to be effective on the work piece held in position in the molding space 40 formed between the molding means 31 and a primary mold means 41. The mold means 41 differ from the primary mold means 24 shown in FIG. 3 in that an elastic bladder 42 is inserted inside the mold body of the mold means 41 for two purposes. The bladder 42 functions as a cooling means and also as a means for increasing the dimensional stability of the mold body 43. The two desirable functions are accomplished by flowing a coolant under pressure through the elastic bladder 42. For example, water under pressure may enter into an inlet port 44 and leave through an exit port 45. The trimming tools 37 have their own drive means in the form of expandable hoses 46 which constitute fourth drive means for moving the trimming tools independently of the third drive means 32. The position of the support brackets 39 for the trimming tools 37 may be adjustable, as is described in more detail in my U.S. Pat. No. 4,273,738, whereby the knives 38 may extend substantially perpendicularly relative to a plane defined by the respective mold.

FIGS. 5, 6, and 7 will now be described in conjunction. These figures are to be viewed in a side-by-side relationship. Each of the FIGS. 5, 6, and 7 provides a view in the direction of the arrow A in FIG. 2. Thus, FIG. 5 illustrates the second auxiliary operating unit 10. FIG. 6 constitutes the main operating unit 1. FIG. 7 constitutes the first auxiliary operating unit 3.

Referring first to FIG. 5, the unit 10 comprises a machine frame 47 which supports fourth mold means 48 forming a mold space 40 with the first or primary mold body 24' or with the primary mold body 43. The fourth mold means 48 are movable up and down by fifth drive means 49, such as a piston cylinder. The piston rod is connected to a mold support 50 which carries the mold 48 through guide rods 51 to which the mold plate 52 is secured by guide bushings 53. Reset springs 54 urge the mold plate 52 and the fourth mold 48 upwardly against expandable pressure application hose means 55. When the pressure is released from the expandable hose means 55, the springs 54 will return the mold means 48, 52 into the upper position ready for the next pressure application to the expandable hose means 55. The closing pressure applied through the hose means 55 may be in the order of, for example, twenty tons. The mold support 60 is guided by vertical guide rods 56. For this purpose, the support 50 is connected to the guide rod 56 by guide bushings or so-called ball boxes 57.

Figure 11:
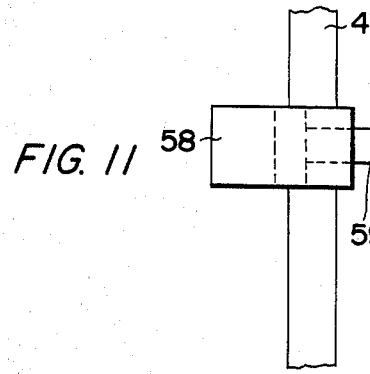
FIG. 11 is a side view of power operated locking means for rigidly locking a mold to the machine frame.

When the mold support 50 is moved downwardly into a mold closing position for cooperation with the first mold means shown in FIG. 6, the mold support 50 will be rigidly locked to the frame structure 47 by locking means 58. FIG. 11 shows the locking means 58, for example in the form of a piston cylinder comprising a piston rod 59 which enters into a respective hole 60 in the mold support 50. Several locking means may be employed, two of which are shown in FIG. 5.

When the mold 48 is in the lowered position for cooperation with the first mold means, the above-mentioned molding or shaping space 40 is formed and a two-compound foaming material may be introduced through a respective bore 61 which may cooperate with a spraying nozzle 62 for the two-component foaming material. The mold 48 is provided with a venting hole 63 for facilitating the foaming operation.

The first or primary mold means will be moved into a cooperating position relative to the fourth said means 48 by means of a conveyor 64, only the upper run of which is shown since the conveyor as such is conventional.

Most of the elements shown in FIG. 6 have already been described with reference to FIGS. 3, 4, and 5. FIG. 6 also includes the locking means 58, 59 for the support 33 of the third mold means 31 whereby the third mold means 31 may be rigidly locked to the machine frame 21'.

The first mold means shown in FIGS. 6 and 7 differ from the first mold means described with reference to FIG. 3 in that in FIGS. 6 and 7 the first mold means 65 comprise two mold members 66 and 67. One mold member 66 is shown in FIG. 6.

The other mold member 67 is shown in FIG. 7. The one mold member 66 carries a mold body 24' of the same kind as shown in FIG. 3. The other mold member 67 carries a mold body 68 which may, for example, be of similar construction. The mold member 66 is supported on a carriage 69. The other mold member 67 is supported on a carriage 70. Each mold member 66 and 67 is rigidly connected to its carriage by removable means, such as threaded bolts 71. A rigid bar 72 interconnects the carriages 69 and 70 to keep the carriages properly spaced from each other. The bar 72 is provided with threaded ends 73 cooperating with threaded holes in the respective carriage 69, 70 for adjusting the exact spacing between the first mold members. Once the spacing is adjusted, the counter nuts 74 are tightened. Both carriages 69 and 70 are operatively connected to the top run 64 of the conveyor which is movable back and forth in the direction of the double arrow 8 or 9 so that the one mold member 66 may cooperate with the fourth mold 48 shown in FIG. 5 or with the third mold 31 shown in FIG. 6, and so that the other mold member 67 with its mold body 68 may cooperate with the second mold means 75 or with the third mold means 31.

Incidentally, the trimming tools 37 shown in FIG. 6 are provided with spring bias reset means 76 and with heating means 77 for the strip steel knives. Such heating means are, for example, described in more detail in my above-mentioned U.S. Pat. No. 4,273,738.

FIG. 7 shows the first auxiliary operating unit 3 which supports the second mold means 75 in a machine frame 78 which is also provided with the above-mentioned locking means 58 cooperating with the support 79 of the second mold means 75 which includes a female mold 80 cooperating with the mold body 68 to form a shaping or molding space 40 which may be filled with a foaming material through a conduit 81 and which is provided with venting means 82. The structure of the mold means 75 is basically the same as that described above with reference to the fourth mold means shown in FIG. 5. Therefore, the second mold means may be briefly described. A second drive means 83 moves the second mold means 75 up and down. The mold closing force is also exerted by expandable hose means 84 as described, against reset spring means 84'.

Figure 8:
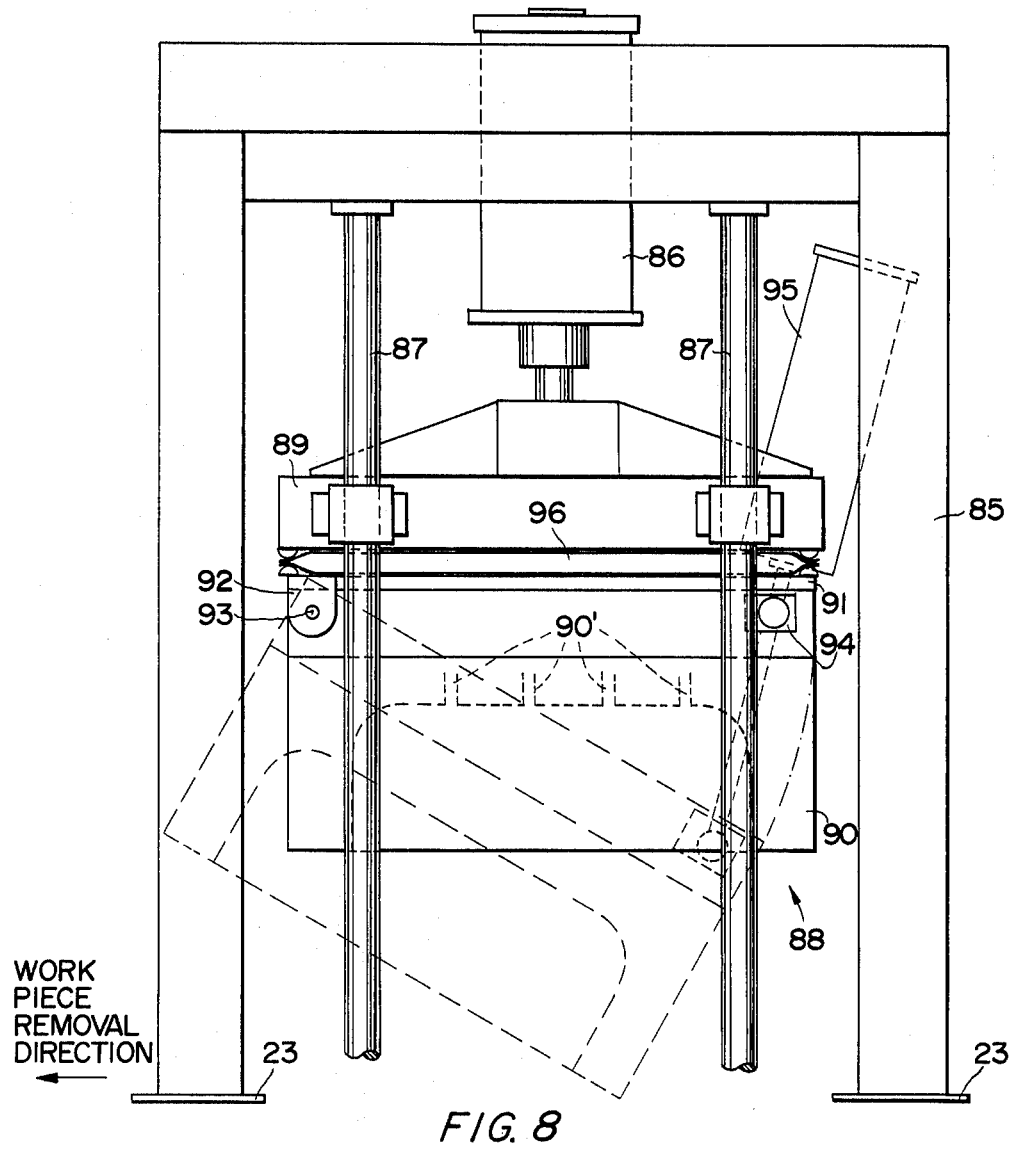
FIG. 8 is a side view of a modified secondary mold means.

FIG. 8 illustrates a modification of a mold means whereby the view extends in the direction of the plane 3—3 in FIGS. 1 or 2. The purpose of this modification is to facilitate the treatment of a secondary mold means after the completion of a work cycle or for removing a finished work piece. In FIG. 8, the machine frame 85 supports the drive means 86 and guide rod 87 for the secondary mold means 88 comprising a support 89 which acts as a counter-force take-up member as in all of the other molding means. The support 89 is connectable to the machine frame 85 by locking means 58, 59 not shown in FIG. 8. The mold 90 is connected to a mold plate 91 by hinges 92 which permit a tilting movement about the hinging axis 93. The mold 90 is shown in its molding position by full lines and in its down-tilted position by dashed lines. In the molding position, locking means 94 lock the mold 90 to the mold plate 91 which is movably secured to the support 89, for example by the same guide rod and guide bushing structure cooperating with reset springs as shown at 51, 53, and 54 in FIG. 5. When the locking means 94 are unlocked, a piston cylinder 95 may move the mold 90 from the full line position into the dashed line position and vice versa. When the locking means 94 are locked in the molding position of the mold 90, the mold closing pressure may be exerted by expandable hose means 96. The mold 90 may be equipped with suction holes 90' for removing and lifting a work piece from the first or primary mold means so that the work piece may be discharged with the aid of gravity after the mold has been tilted downwardly into the dashed line position and then shutting off the suction through the holes 90' or by replacing the suction through holes 90' by a sufficient expulsion pressure. In the tilted down position it is also easier to clean the secondary mold means after the work piece removal and to spray the secondary mold means with a coating, such as a wax coating, for avoiding the sticking of the work piece to the walls of the mold means.

Figure 9:
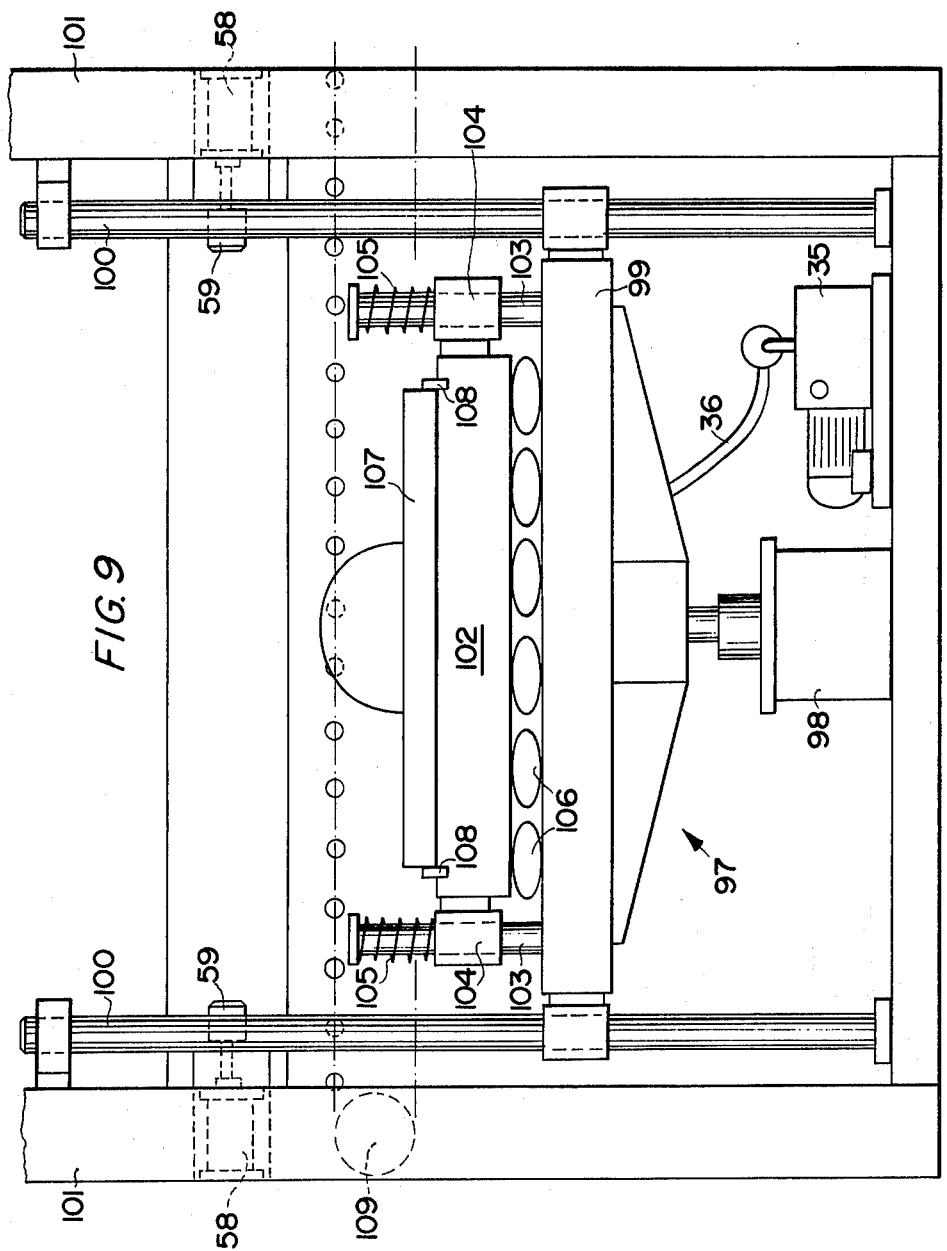
FIG. 9 is a front view similar to that of FIG. 6 but showing modified primary mold means.

FIG. 9 illustrates a modification of the first molding means. The modification comprises molding means 97 which are vertically movable by piston cylinder means 98 carrying the mold support 99 which is guided in its up and down movement by vertical rods 100 held in the machine frame 101. The support 99 carries a mold plate 102 by means of guide rods 103 extending through guide bushings 104 cooperating with reset springs 105. The molding or mold closing pressure is exerted by expandable hose means 106 as described. The closing pessure may be substantial, for example in the order of twenty tons. In the raised, mold closing position, the mold support 99 may cooperate with the locking means 58, 59, also as described above.

In FIG. 9 the mold bold 107 is removably secured to the mold plate 102 and a mold body centering structure 108 assures the proper positioning of the mold body 107 on the mold plate 102. The mold body 107 may thus be removed manually by the operator and placed on a conveyor 109 for a horizontal tansporation of the mold body 107 into the adjacent station, not shown, for cooperation with the second mold means as described above. The conveyor 109 may, for example, be of the same kind as shown at 17, 18 in FIG. 3.

In the embodiment of FIG. 9, the work piece, not shown, would also remain on the mold body 107 during all manufacturing steps. The initial shaping would also be accomplished by suction means 35, 36 operatively connected to the mold body 107.

Figure 10:
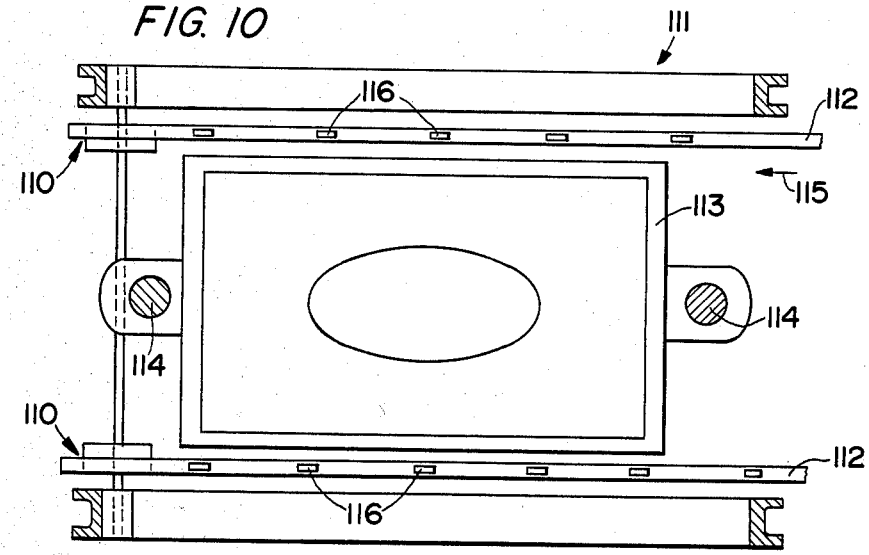
FIG. 10 is a top view onto the primary mold means of FIG. 6 whereby unimportant parts have been omitted.

FIG. 10 shows a modification of a conveyor system 110 for the supply of flat blanks of material into the main operating unit 111. In FIG. 3 it is necessary that the conveyor means 17 shuttles back and forth horizontally so that the left-hand end of the conveyor 17 is out of the way for the cooperation of the mold body 24' with the third mold means 31. Such a shuttling movement is not necessary for the conveyor means 110 because the conveying chains 112 are sufficiently spaced from each other so that the mold body 113 may be moved vertically up and down guided by the guide rods 114 without interference with the conveyor chains 112. These conveyor chains 112 move continuously forward in the direction indicated by the arrow 115 and it is not necessary that the entire conveyor system is shuttled back and forth for moving the flat blanks of plastic material into position above the mold body 113. The chains 112 are equipped with clamping members 116 which hold the flat blank and which are manually opened by the operator in order to deposit the blank on the mold body 113.

A system such as shown in FIG. 1 would comprise the machines shown in FIGS. 5 and 6 whereby the primary mold means would comprise just a single mold. It is also not important whether the auxiliary operating unit is arranged to the right of the main operating unit or to the left thereof. In both instances the system would perform the following steps. A preheated flat blank is removed from the conveyor 17 by the operator and placed on the mold body 24' of the primary mold means. The vacuum pump 35 is switched on whereby the blank is sucked against the shape of the primary mold body 24' to assume the shape thereof. The mold body carrying the shaped work piece now moves into the auxiliary station. The first secondary mold means are lowered and locked by the locking means 58, 59 into the mold closing position. The two components foaming material, such as polyurethane foam, is now introduced into the mold space 40. The molding pressure is now exerted by pressurizing the expandable hose means such as 55 or 84. The mold means remain closed until the two components foam has sufficiently cured to properly bond to the blank. The lock is opened and the first secondary mold means are lifted vertically. The primary mold means move back into the main operating unit and the second counter-holder mold means 31 of the secondary mold means are lowered by the third drive means 32. The locking means are closed and the trimming tools 37 are operated, for example, by pressurizing the expandable hose means 46.

The second secondary mold means are then lifted and the work piece removed from the mold body 24' by cutting off the suction, for example through a valve in the conduit 36. The finished work piece is then removed from the mold body 24' by the operator or lifted off the mold body 24', as described above with reference to FIG. 8. It should be noted that the counter-holder or the second secondary mold means may be omitted if the vacuum holding of the work piece is sufficient to hold the work piece in position during the trimming operation. The use of counter-holder means will primarily depend on the type and size of the work piece. Moreover, the removal of the work piece 2 from the mold body 24' may be facilitated by temporarily introducing increased pressure into the mold body 24'. This may also be accomplished through the holes 25.

The system shown in FIG. 2 and illustrated in more detail in the combination of FIGS. 5, 6, and 7 operates as follows. A preheated work piece 2 is placed on the mold body 24' forming a one primary mold member and the vacuum is switched on. The carriage 69 moves to the left in the direction of the arrow 9 to bring the mold body 24' into cooperation with the third secondary molding means. The third mold means are lowered by the fourth drive means 49 and the mold means are locked in the closed position. The foaming operation is performed and the primary and secondary mold means remain closed until a sufficient curing has taken place. Meanwhile, a second work piece is placed on the mold body 68 forming the other primary mold member which is in the main machine shown in FIG. 6 while the body 24' is in the machine shown in FIG. 5. The third secondary mold means are then unlocked and opened and the two mold members of the primary mold means move to the right in the direction of the arrow 8. The first secondary mold means 75 are brought into the mold closing, locked position shown in FIG. 7 whereby the shaping may take place by pressure forming rather than by vacuum forming. The foaming is accomplished by introducing the two-component foaming material through the conduit 81 into the mold space 14 and the foam is permitted to cure. Meanwhile, in the main operating unit, the foam mold means with the trimming tools have been lowered for the trimming of the first work piece while the second work piece is still curing in the machine of FIG. 7. During this curing time, the second mold means with the trimming tools is lifted and the finished work piece is removed from the mold body 24' and the next preheated blank is placed on the mold body 24' of the primary mold means for a repetition of the described steps. As the mold body 24' moves to the left again, the mold body 68 also moves to the left simultaneously after the first secondary mold means have been unlocked and lifted. Now the trimming operation takes place in the main machine shown in FIG. 6 for the work piece on the mold body 68. The work piece is then removed from the mold body 68 and a new blank is introduced. Thus, the two carriages 69 and 70 move in unison to the left and right and left again in a continuous repetition of the described work steps.

Although the invention has been described with reference to specific example embodiments, it will be appreciated, that it is intended, to cover all modifications and equivalents within the scope of the appended claim.

What is claimed is:

1. A method for manufacturing three-dimensional work pieces, comprising the following steps:
   a. placing a flat blank of plastics material into or onto a primary mold means compatible for sequential cooperation with a plurality of secondary mold means,
   b. shaping said flat blank while it contacts the primary mold means into a molded blank which assumes the form of the primary mold means,
   c. bringing the molded blank while it still contacts the primary mold means on one side, into contact with foaming material on the other side of the molded blank for performing a foaming, and closing the primary mold means by a first, secondary mold means for confining and curing of the foaming material whereby the foamed material is bonded to the plastics material of the molded blank to form said three-dimensional work piece,
   d. separating the primary mold means and the three-dimensional work piece still held by the primary mold means from the first, secondary mold means, e. moving the primary mold means with the three-dimensional work piece still being held by the primary mold means into a cooperating position relative to a second, secondary mold means operating as a counterholder, and f. moving trimming tools relative to a three-dimensional plane defined by at least one of said mold means for trimming the three-dimensional work piece while it is still being held by said primary mold means, whereby the work piece remains on the same primary mold means during all recited manufacturing steps for assuring the dimensional accuracy and stability of the three-dimensional work piece.

2. The method of claim 1, wherein said step (c) is performed by primary closing said first mold means by said second mold means to form a molding space into which the foaming material is introduced and wherein the foaming material is cured for said bonding.

3. The method of claim 1 or 2, further comprising horizontally shuttling the primary mold means back and forth for sequential cooperation with said first or second secondary mold means, said shuttling constituting a linear or rotational movement in alternately opposite directions.

4. The method of claim 3, further comprising vertically reciprocating the first and second secondary mold means into and out of respective cooperating positions relative to the primary mold means, whereby said horizontal shuttling of the primary mold means is synchronized with the vertical reciprocating of the first and second secondary mold means.

5. The method of claim 1 or 2, further comprising locking at least one of said mold means into a rigid position relative to a machine frame, and then applying pressure to the mold means whereby the mold closing and forming pressure is taken up by said machine frame.

6. The method of claim 1, further comprising providing third secondary mold means, providing said primary mold means as two mold members, reciprocating said two primary mold members in alternately opposite directions so that one primary mold member may cooperate with the first and second secondary mold means and so that the other primary mold member may cooperate with the third and second secondary mold means in the following sequence of steps, placing a first flat blank on said one primary mold member of the primary mold means and shaping said first flat blank, shifting said primary mold means in a given direction for cooperation between said one primary mold member and the second secondary mold means for said foaming and curing, placing while said foaming and curing takes place, a second flat blank on the other primary mold member of the primary mold means and shaping said second flat blank, shifting said primary mold means in a direction opposite to said first direction for cooperation between said other primary mold member and the third secondary mold means for a respective foaming and curing, performing said trimming of the work piece on said one primary mold member while the work piece on the other primary mold member is curing and replacing the trimmed work piece from said one primary mold member by a new flat blank for repeating the recited steps whereby the production capacity is substantially doubled as compared to claim 1.

7. The method of claim 1 or 6, further comprising heating said flat blank and feeding the heated flat blank into or onto the primary mold means in a direction extending substantially at a right angle relative to any direction of movement of the primary mold means, and removing the finished three-dimensional work piece from said primary mold means.

8. The method of claim 1 or 6, wherein said shaping step is performed by applying a vacuum through said primary mold means whereby the flat blank is sucked against the primary mold means.

9. The method of claim 1 or 6, wherein said shaping step is performed by closing the first primary mold means by a complementary secondary mold means.

10. The method of claim 1, further comprising temperature controlling at least said primary mold means by flowing a fluid through said primary mold means.

11. The method of claim 5, wherein said pressure is applied to the primary or secondary mold means by means of expandable hose power applicators.

12. An apparatus for manufacturing a three-dimensional work piece, comprising a first station including primary mold means, means movably supporting said primary mold means in said first station, first drive means operatively connected to said primary mold means for reciprocating said primary mold means in a given direction, shaping means arranged for cooperation with said primary mold means for shaping a flat blank of plastics material into a molded blank which assumes the form of the primary mold means, a second station arranged next to said first station, said second station comprising first secondary mold means movably mounted for cooperation with said primary mold means, second drive means operatively connected to said first secondary mold means for moving the first secondary mold means relative to said primary mold means, second secondary mold means operating as counterholder movably supported in said first station, third drive means operatively connected to said second secondary mold means for moving the second secondary mold means in said first station relative to said primary mold means, trimming tool means operatively supported by said secondary mold means for trimming the three-dimensional work piece, and fourth drive means operatively connected to said trimming tool means for moving the trimming tool means relative to a three-dimensional plane defined by at least one of said mold means, whereby a work piece remains on said primary mold means during all manufacturing steps.

13. The apparatus of claim 12, wherein said primary mold means comprise first and second primary mold members connected to each other, said apparatus further comprising a third station arranged for cooperation with said first station, third secondary mold means movably supported in said third station and fifth drive means for moving said third secondary mold means relative to said primary mold means, whereby said first primary mold member may cooperate with the first and second secondary mold means, while the second primary mold member may cooperate with the second and third secondary mold means.

14. The apparatus of claim 12 or 13, further comprising flat blank supply and heating means operatively arranged to feed heated blanks to said primary mold means substantially in a direction extending perpendicularly to said given direction of reciprocation of said primary mold means.

15. The apparatus of claim 12 or 13, wherein said shaping means comprise a vacuum source, means operatively connecting said vacuum source to said primary mold means, and apertures in said primary mold means for sucking said flat blank against the shape of said primary mold means.

16. The apparatus of claim 12, wherein said first or second secondary mold means cooperate with said primary mold means to constitute said shaping means.

17. The apparatus of claim 13, wherein said first or second or third secondary mold means cooperate with said primary mold means to constitute said shaping means.

18. The apparatus of claim 12 or 13, wherein said stations comprise frame means and releasable locking means secured to said frame means for rigidly locking said mold means to said frame means for directly introducing any shaping or mold closing pressure into said frame means.

19. The apparatus of claim 12 or 13, further comprising expandable hose power application means operatively connected to said mold means for exerting a mold closing force on said mold means.

20. The apparatus of claim 12 or 13, further comprising machine frame means for each of said stations, horizontal first guide means secured in said machine frame means for guiding a horizontal reciprocating movement of said primary mold means, and vertical second guide means secured in said machine frame means for guiding a vertical reciprocating movement of the respective secondary mold means.

21. The apparatus of claim 12 or 13, wherein said first, second, or third secondary mold means comprise backing means and molding means, hinging means tiltably securing the respective molding means to its backing means, operating means connected to said molding means for tilting the molding means between a closed molding position and an open work piece removing position, and locking means for locking said molding means to its backing means in the closed molding position.

* * * * *

UNITED STATES PATENT AND TRADEMARK OFFICE
CERTIFICATE OF CORRECTION

PATENT NO. : 4,405,537
DATED : September 20, 1983
INVENTOR(S) : Ernst M. Spengler It is certified that error appears in the above-identified patent and that said Letters Patent is hereby corrected as shown below:

Claim 2, column 11, line 16, replace "primary closing" by --first closing--; replace "first mold" by --primary mold--.

Claim 9, column 12, line 10, delete "first".

Please cancel non-elected claims 12 to 21.

On the title page "21 Claims, 11 Drawing Figures" should read -- 11 Claims, 11 Drawing Figures --.

Signed and Sealed this

Eighteenth Day of September 1984

[SEAL]

Attest:

GERALD J. MOSSINGHOFF

Attesting Officer

Commissioner of Patents and Trademarks